United States Patent [19]

Zantos

[11] Patent Number: 5,268,680
[45] Date of Patent: Dec. 7, 1993

[54] COMBINED INFRARED-RADAR DETECTION SYSTEM

[75] Inventor: Nicholas G. Zantos, Arlington, Mass.

[73] Assignee: Raytheon Company, Lexington, Mass.

[21] Appl. No.: 70,279

[22] Filed: Sep. 8, 1970

[51] Int. Cl.⁵ .............................................. G01S 13/86
[52] U.S. Cl. ........................................ 342/53; 342/62; 343/720; 343/725; 343/781 CA
[58] Field of Search .................. 343/6 ND, 6 A, 6 R, 343/767, 771, 909, 838, 720, 725, 781 CA, ; 342/53, 62

[56] References Cited

U.S. PATENT DOCUMENTS

| | | | |
|---|---|---|---|
| 2,820,220 | 1/1958 | Charman | 343/767 |
| 2,972,743 | 2/1961 | Svensson et al. | 343/6 ND |
| 3,025,515 | 3/1962 | Fairbanks | 343/6 ND |
| 3,114,149 | 12/1963 | Jessen, Jr. | 343/6 ND |
| 3,165,749 | 1/1965 | Cushner | 343/6 ND |
| 3,312,976 | 4/1967 | Gregory | 343/767 |

*Primary Examiner*—Harold J. Tudor
*Attorney, Agent, or Firm*—Donald F. Mofford; Richard M. Sharkansky

[57] ABSTRACT

A combined infrared-radar detection system wherein a radar antenna also serves as the primary mirror in an infrared focusing arrangement.

6 Claims, 1 Drawing Sheet

COMBINED INFRARED-RADAR DETECTION SYSTEM

BACKGROUND OF THE INVENTION

This invention relates generally to electromagnetic detection apparatus and more particularly to apparatus for the detection of both infrared and radar energy.

The desirability of combining an infrared detection system and a radar detection system is well known. In particular, such combined systems are extremely useful when employed in a semi-active air-to-air missile. Such a missile is operated in conjunction with a remote radar transmitter, as a target tracking radar carried by a missile launching aircraft. A combined infrared and radar detection system permits the radar system to be employed for long range target engagements and the infrared system to be employed at short range or "dog fight" engagements where it is difficult for the missile launching aircraft to provide proper radar illumination of the target.

Attempts to combine both an infrared detection system and a radar detection system have resulted in the use of a reflective radar antenna in combination with a reflective infrared optical configuration. Such combined reflective configurations have the disadvantage of requiring separate infrared-radar reflective surfaces, each such reflective surface being of different curvature and material so as to thereby properly focus the radar energy and the infrared energy to their respective detection elements.

SUMMARY OF THE INVENTION

It is therefore an object of the invention to provide an improved electromagnetic energy detection apparatus, such apparatus being responsive to both optical electromagnetic energy and radio frequency electromagnetic energy.

It is another object of the invention to provide an improved combined radio frequency energy-infrared energy detection system.

These and other objects of the invention are accomplished through use of a combined antenna and focusing element fabricated in a manner such that radio frequency energy may pass therethrough and then be detected and infrared energy, after reflection from such combined antenna and focusing element, may be detected.

BRIEF DESCRIPTION OF THE DRAWINGS

For a better understanding of the present invention reference should now be made to the following description taken in connection with the accompanying drawings in which.

DESCRIPTION OF THE PREFERRED EMBODIMENT

Figure 1:
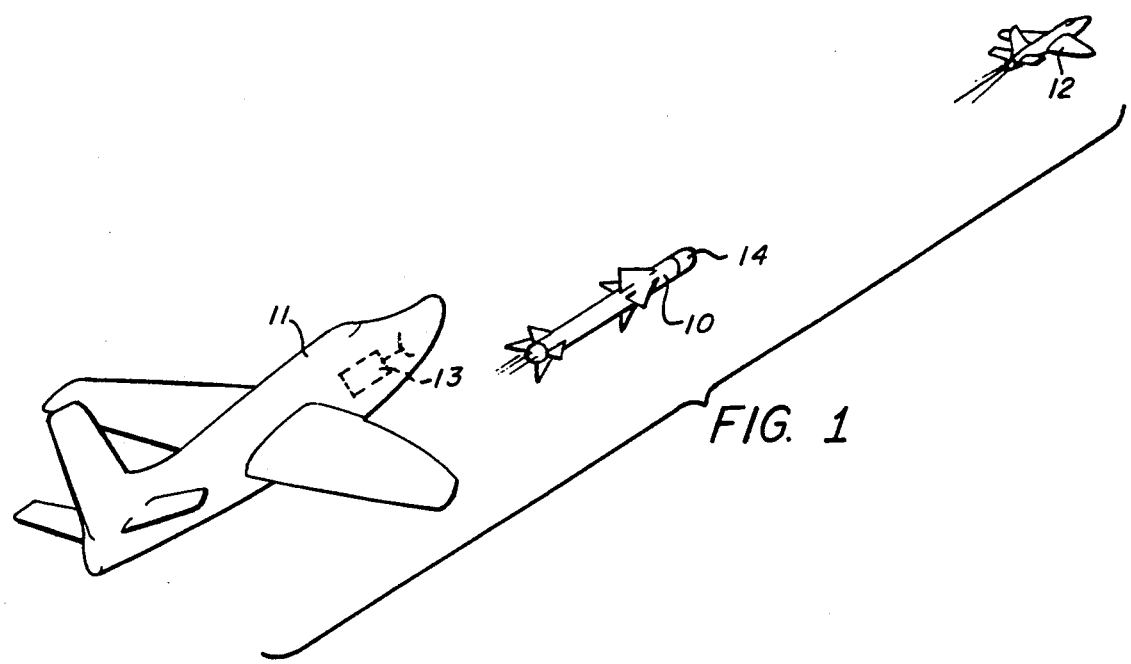
FIG. 1 is a sketch illustrating a typical intercept situation wherein a missile employing the invention is launched from an aircraft and directed towards a target.

FIG. 1 shows a missile 10 launched from an aircraft 11 and directed at a target 12. The aircraft 11 carries a radar transmitter 13 for illuminating and tracking the target 12. A portion of the radio frequency energy transmitted by radar transmitter 13, after reflection from the target 12, passes through a frontal portion 14 of the missile 10. At the same time, a portion of the infrared energy emitted from the target 12 also passes through the frontal portion 14 of missile 10. Such radio frequency energy and the infrared energy is then processed in a manner now to be described to derive control signals for the missile 10 to intercept the target 12.

Figure 2:
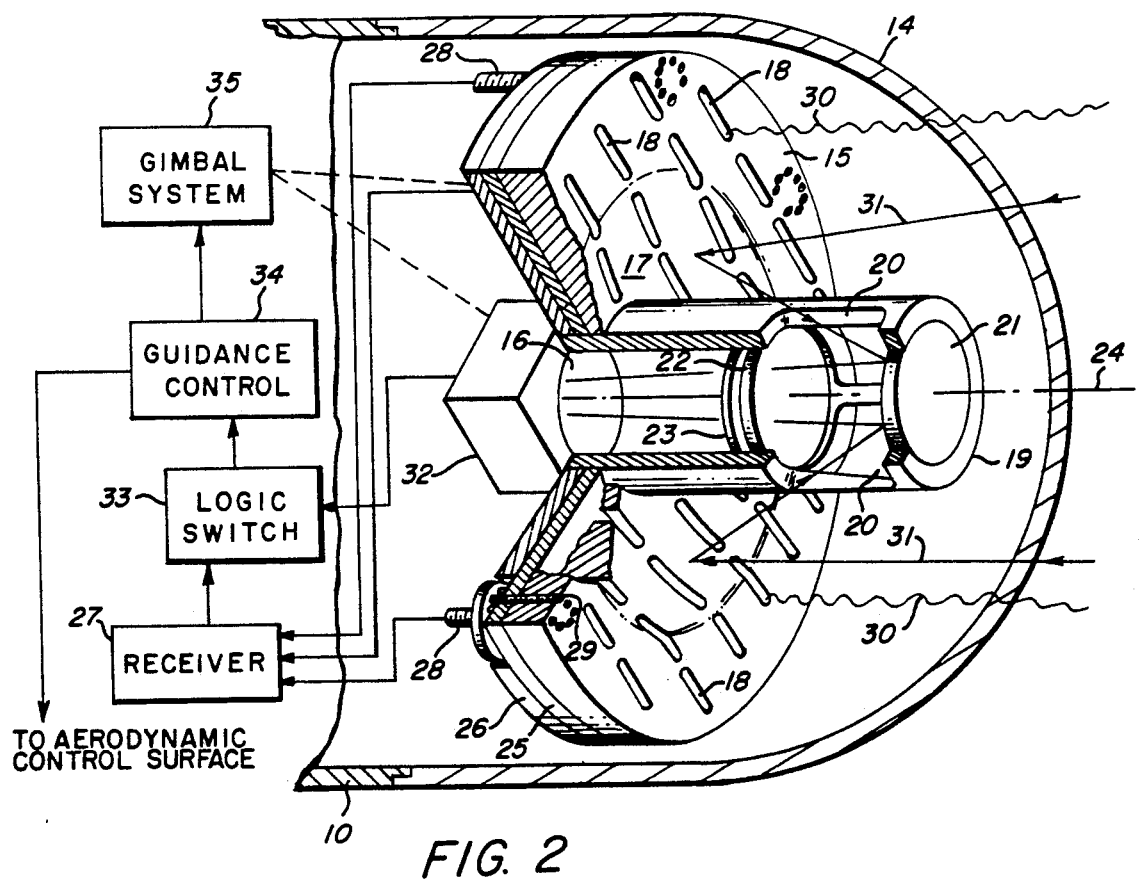
FIG. 2 is an isometric view of an embodiment of the invention, partially broken away and somewhat distorted, to show the concepts thereof.

FIG. 2 shows a combined infrared-radar detection system disposed within the frontal portion 14 of missile 10. The frontal portion of missile 10 consists of a dome, such dome being of conventional construction and having appropriate radio frequency and infrared transmittance characteristics. An antenna and focusing element 15 fabricated from a disc-shaped metallic material, as aluminum, has an aperture 16 formed in the center portion thereof. Adjacent to aperture 16 a concave surface 17 (which, as will become clear, serves as an element in the focusing arrangement for infrared energy) is formed on a face of the antenna and focusing element 15. The face of antenna and focusing element 15 is then heat treated, coated with an infrared reflective material, here nickel, and processed so that such face has a proper optically reflective characteristic to infrared energy incident thereon. The disposition of the slots 18 is determined in accordance with the design criteria of a conventional flat plate slotted array radar receiving antenna, taking into consideration the radio frequency efficiency of such antenna and the quality of the reflective optical characteristics required of the face of the antenna element.

Optical element support column 19, a cylindrical structure with ports 20 formed on the surface thereof, is mounted in any convenient way to antenna and focusing element 15 at the periphery of aperture 16. The optical element support column 19 in turn supports a secondary mirror 21 and corrective lenses 22 and 23 within its structure so as to maintain such elements essentially orthogonal to the longitudinal axis 24 of such column.

A conventional stripline feed network 25, the design of which is consistent to provide a monopulse antenna, is mounted on the back side of antenna and focusing element 15. The stripline feed network 25 also provides the impedance matching mechanism necessary because of the different slot depths resulting from the concave surface of antenna and focusing element 15. That is, the stripline feed network 25 is designed in a conventional manner to compensate for such slot depth variations and to generate a proper phase distribution to radio frequency energy passing through slots 18.

Monopulse arithmetic unit 26 is coupled in a conventional manner to antenna feed network 25. The monopulse arithmetic unit 26 is of conventional design to provide the sum, azimuth difference and elevation difference signals characteristic of a monopulse antenna. Such sum and difference signals are coupled from the monopulse arithmetic unit 26 to radar receiver 27 by means of terminal connectors 28. The antenna element 15, stripline feed network 25, monopulse arithmetic unit 26 and terminal connectors 28 are mounted together by means of screws 29 and the base (not numbered) of terminal connectors 28.

Referring to FIG. 1 and FIG. 2, in operation, a portion of radio frequency energy reflected by the target 12 and passing through the frontal portion 14 of missile 10 follows path 30 through rectangular slots 18 onto stripline feed network 25 and is processed by such feed network, arithmetic unit 26 and radar receiver 27 to thereby provide a measure of the angular information between the target 12 and longitudinal axis 24. Longitudinal axis 24 thereby represents the boresight axis of the radar detection system. The greater part of infrared energy emitted from the target 12 and passing through the frontal portion 14 of missile 10 follows path 31. Such infrared energy, however, is almost completely reflected by concave surface 17, passing through ports 30 of the optical support column 19 onto the reflective surface of the secondary mirror 21. The infrared energy reflected by secondary mirror 21 passes through corrective lenses 22 and 23 whereby such reflected infrared energy is focused in proper quality through aperture 16 to a point on the focal plane (not shown) of infrared detector and processing unit 32. The concave surface 17, secondary mirror 21 and optical arrangement together make up a Cassegrainian focusing arrangement. The infrared detection and processing unit 32 includes means (not shown) for detecting the infrared energy at a point on the focal plane of such unit and for measuring the angular information between the target 12 and longitudinal axis 24. Longitudinal axis 24 thereby represents, in addition to the boresight axis of the radar detection system, the boresight axis of the infrared detection system. The detecting and measuring means (not shown) included in the infrared detection and processing unit 32 can be any conventional infrared scanning configuration, such as a rotating reticle configuration.

The angular information generated by receiver 27 and detection and processing system 32 is transmitted to logic switch 33. The logic switch 33 selects either the radar system generated angular information or the infrared system generated angular information for use by guidance and control section 34. Such selection can be based on range information obtained from radar receiver 27 or by means of a command signal obtained from the launching aircraft 11 prior to firing of the missile 10. Guidance control section 34 produces control signals for the missile aerodynamic control surfaces (not shown). The gimbal system 35 is used to gimbal in a conventional manner the antenna and focusing element 15 and the infrared detection and processing system 32 with respect to the missile body.

It will be obvious to one of ordinary skill in the art that a conical scan antenna system could be used instead of a monopulse antenna system through the use of ferrite phase shifters in place of arithmetic unit 26, such phase shifters being coupled to the feed network 25 in a conventional manner. It is therefore understood that the invention is not limited to the specific embodiment as shown, but only by the spirit and scope of the appended claims.

What is claimed is:

1. In a system for detecting electromagnetic energy radiating from a target, such energy being in the radio frequency and infrared frequency portion of the electromagnetic spectrum, a receiving apparatus comprising:
   (a) an antenna and focusing element, such element having, an aperture centrally formed therein, such element being formed as a radio frequency array antenna for receiving the radio frequency energy, such element having a concave surface for reflecting infrared frequency energy incident thereon and focusing such reflected energy at a point spatially disposed from such element;
   (b) focusing means, disposed adjacent to such point for directing the infrared energy reflected by the concave surface of the antenna and focusing element through the aperture formed within such element;
   (c) infrared frequency energy detection means for detecting the infrared energy directed through the aperture formed within the antenna and focusing element; and
   (d) radio frequency detection means for detecting the radio frequency energy received by the antenna and focusing element.

2. In a system for detecting electromagnetic energy radiating from a target, such energy being in the radio frequency and infrared frequency portion of the electromagnetic spectrum, a receiving apparatus comprising:
   (a) an antenna and focusing element, such element having: an inner portion and an outer portion concentric one with the other; an aperture centrally formed therein; and, a plurality of rectangular slots formed therein, such element being responsive to radio frequency energy incident thereon for receiving such radio frequency energy, such inner portion having a concave surface for reflecting infrared energy incident thereon and focusing such reflected energy at a point spatially disposed from such element;
   (b) focusing means, disposed adjacent to such point, for directing the infrared energy reflected by such concave surface of the antenna and focusing element through the aperture formed within such element;
   (c) infrared frequency energy detection means for detecting the infrared energy directed through the aperture formed within the antenna and focusing element; and
   (d) radio frequency detection means for detecting the radio frequency energy received by the antenna and focusing element.

3. In a system for detecting electromagnetic energy radiating from a target, such energy being in the radio frequency and infrared frequency portion of the electromagnetic spectrum, a receiving apparatus wherein the infrared energy is focused to a detector through a Cassegrainian focusing arrangement and a primary reflector of such focusing arrangement is a radio frequency array antenna.

4. The receiving apparatus recited in claim 3, wherein the primary reflector has formed therein a plurality of rectangular slots.

5. A Cassegrainian focusing arrangement for infrared energy, a primary reflector thereof being a radio frequency array antenna.

6. Apparatus for separating infrared energy and radio frequency energy comprising an optical system for focusing infrared energy onto a focal plane, such optical system including a radio frequency array antenna as an element thereof, a boresight axis of the optical system and a boresight axis of the antenna being coaxial.

* * * * *